(12) United States Patent
Shapiro et al.

(10) Patent No.: US 9,830,910 B1
(45) Date of Patent: Nov. 28, 2017

(54) NATRUAL VOICE SPEECH RECOGNITION FOR FLIGHT DECK APPLICATIONS

(71) Applicant: Rockwell Collins, Inc., Cedar Rapids, IA (US)

(72) Inventors: Geoffrey A. Shapiro, Cedar Rapids, IA (US); David L. Leedom, Center Point, IA (US); Nicholas M. Lorch, North Liberty, IA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 259 days.

(21) Appl. No.: 14/038,249

(22) Filed: Sep. 26, 2013

(51) Int. Cl.
 *G10L 17/00* (2013.01)
 *G10L 15/26* (2006.01)
 *G10L 15/22* (2006.01)

(52) U.S. Cl.
 CPC ............ *G10L 15/265* (2013.01); *G10L 15/22* (2013.01); *G10L 2015/223* (2013.01); *G10L 2015/228* (2013.01)

(58) Field of Classification Search
 CPC ......... G10L 15/00; G10L 15/22; G10L 15/26; G10L 15/265; G10L 2015/221; G10L 2015/223; G10L 2015/228; G06F 3/167
 See application file for complete search history.

(56) References Cited

U.S. PATENT DOCUMENTS

| | | | |
|---|---|---|---|
| 4,725,956 A | 2/1988 | Jenkins | |
| 5,818,423 A | 10/1998 | Pugliese et al. | |
| 5,926,790 A * | 7/1999 | Wright | 704/275 |
| 5,974,384 A | 10/1999 | Yasuda | |
| 6,173,192 B1 | 1/2001 | Clark | |
| 7,089,108 B2 | 8/2006 | Merritt | |
| 7,174,300 B2 * | 2/2007 | Bush | 704/275 |
| 7,415,326 B2 | 8/2008 | Komer et al. | |
| 7,580,377 B2 * | 8/2009 | Judd | 370/277 |
| 7,606,715 B1 | 10/2009 | Krenz | |
| 7,809,405 B1 | 10/2010 | Rand et al. | |
| 7,881,832 B2 * | 2/2011 | Komer et al. | 701/3 |
| 7,912,592 B2 | 3/2011 | Komer et al. | |
| 8,078,341 B2 * | 12/2011 | Gutierrez-Castaneda | G08G 5/0039 701/3 |
| 8,139,025 B1 | 3/2012 | Krenz | |
| 8,180,503 B2 * | 5/2012 | Estabrook | B64C 13/18 340/945 |
| 8,234,121 B1 | 7/2012 | Swearingen | |
| 8,296,141 B2 * | 10/2012 | Gilbert et al. | 704/254 |
| 8,311,827 B2 | 11/2012 | Hernandez et al. | |
| 8,374,732 B2 * | 2/2013 | Vial | 701/3 |

(Continued)

OTHER PUBLICATIONS

U.S. Appl. No. 13/248,814, filed Sep. 9, 2011, Barber.
U.S. Appl. No. 14/013,883, filed Aug. 29, 2013, Shapiro.

*Primary Examiner* — Richard Zhu
(74) *Attorney, Agent, or Firm* — Angel N. Gerdzhikov; Donna P. Suchy; Daniel M. Barbieri

(57) ABSTRACT

A computer system receives a voice command and applies one or more contextual filters produce avionics commands based on the voice command. Elements of the voice command are displayed for acceptance by a pilot before being implemented by an avionics system. Individual elements are reevaluated as necessary. Contextual filters include flight paths, flight phase, aircraft location, current weather conditions or information associated with a particular airport.

15 Claims, 7 Drawing Sheets

(56) References Cited

U.S. PATENT DOCUMENTS

| | | |
|---|---|---|
| 8,515,763 B2 | 8/2013 | Dong et al. |
| 2003/0110028 A1 | 6/2003 | Bush |
| 2005/0203700 A1 | 9/2005 | Merritt |
| 2006/0015338 A1* | 1/2006 | Poussin .................. 704/251 |
| 2006/0123027 A1* | 6/2006 | Kohlhammer et al. ...... 707/101 |
| 2007/0016345 A1* | 1/2007 | Plogmann ............. G01C 23/005 |
| | | 701/3 |
| 2007/0288242 A1 | 12/2007 | Spengler et al. |
| 2008/0065275 A1 | 3/2008 | Vizzini |
| 2008/0201148 A1* | 8/2008 | Desrochers .................. 704/257 |
| 2010/0030400 A1 | 2/2010 | Komer et al. |
| 2011/0125503 A1* | 5/2011 | Dong ..................... G10L 15/22 |
| | | 704/275 |
| 2012/0110456 A1* | 5/2012 | Larco ..................... G06F 3/167 |
| | | 715/728 |
| 2012/0290298 A1* | 11/2012 | Ljolje et al. .................. 704/235 |
| 2013/0060571 A1* | 3/2013 | Soemo et al. ................ 704/251 |
| 2013/0275139 A1* | 10/2013 | Coleman ..................... 704/275 |

* cited by examiner

NATRUAL VOICE SPEECH RECOGNITION FOR FLIGHT DECK APPLICATIONS

FIELD OF THE INVENTION

The present invention is directed generally toward avionics systems and more particularly to speech recognition in avionics systems.

BACKGROUND OF THE INVENTION

Traditional interface devices such as touchscreens, cursor control devices and knobs all require a pilot to go "heads-down" when changing data within avionics systems to locate a control, move a cursor to an item to be changed, select the item, input a new value and accept the change. Entering data demands gross and fine motor control as well as visual attention, all of which can distract a pilot.

Voice recognition technology could allow a pilot to input command changes, but existing voice recognition technology is not accurate or reliable enough for aircraft avionics applications. In an avionics application, voice recognition technology needs to be able to allow a pilot to dictate any International Civil Aviation Organization (ICAO) identifier or common name from navigation databases, but navigation databases include many thousands of items making fast, accurate voice recognition difficult.

Consequently, it would be advantageous if an apparatus existed that is suitable for quickly and accurately translating voice commands in an avionics application.

SUMMARY OF THE INVENTION

Accordingly, the present invention is directed to a novel method and apparatus for quickly and accurately translating voice commands in an avionics application.

In one embodiment of the present invention, a computer system receives a voice command and parses the voice command into a string of words. The computer system identifies a first word, searches a database for the first word and identifies a context associated with the first word. The computer system then identifies a second word and searches a database based on the context associated with the first word. The computer system then constructs a command suitable for an avionics system.

In some embodiments of the present invention, contexts include flight paths, flight phase, aircraft location, current weather conditions or information associated with a particular airport. In additional, contextual filters could include action oriented filters.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the subject matter disclosed, which is illustrated in the accompanying drawings. The scope of the invention is limited only by the claims; numerous alternatives, modifications and equivalents are encompassed. For the purpose of clarity, technical material that is known in the technical fields related to the embodiments has not been described in detail to avoid unnecessarily obscuring the description.

Figure 1:
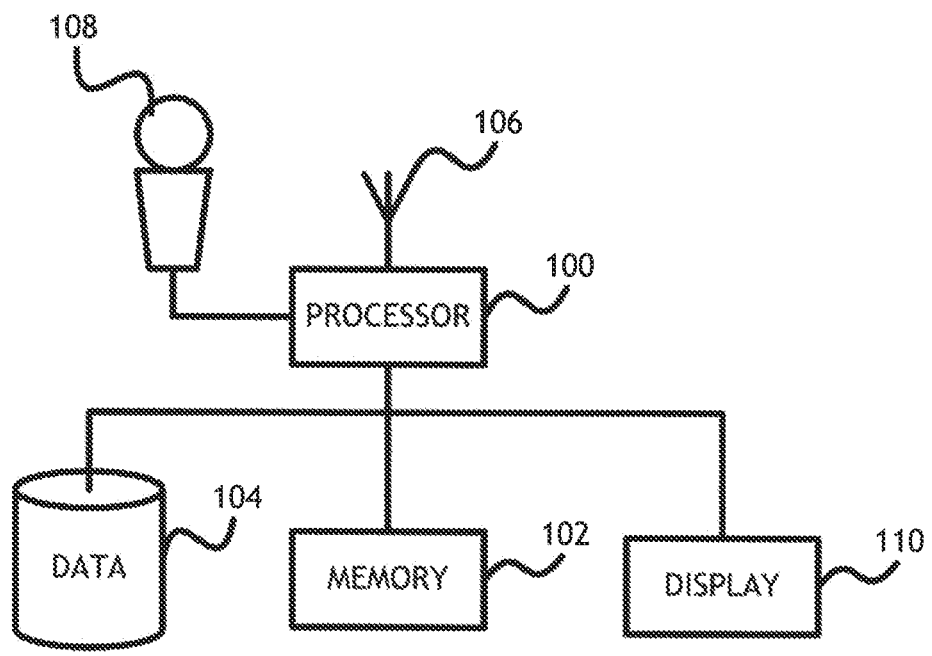
FIG. 1 shows a block diagram of a computer system useful for implementing embodiments of the present invention.

Referring to FIG. 1, a block diagram of a computer system useful for implementing embodiments of the present invention is shown. In at least one embodiment, the computer system includes a processor 100, a memory 102 connected to the processor 100, a data storage element 104 connected to the processor 100 and a microphone 108 connected to the processor 100. The processor 100 is configured to receive data corresponding to a voice command through the microphone 108, parse the data into one or more words comprising the voice command and search one or more databases in the data storage element 104 for the one or more words. The processor 100 produces one or more avionics commands based on the voice commands, and relays such avionics commands to one or more avionics systems.

When searching the one or more databases for the one or more words, the processor 100 is configured to sort entries in the one or more databases, or select a subset of the one or more databases, based on a context associated with at least one of the one or more words. In at least one embodiment, a context is determined by dynamic factors such as the location of an aircraft, a flight plan, one or more weather conditions or other such factors relevant to an aircraft, airspace or flight parameter.

In another embodiment, the computer system receives the data corresponding to the voice command through a communications system 106. Likewise, the computer system may receive data pertaining to factors relevant to an aircraft, airspace or flight parameter through the communications system 106.

The computer system must effectively communicate the avionics commands as well as a summary of the changes presented. The computer system therefore includes a display 110 connected to the processor 100 to display this information. Voice syntax may be broken down into individual commands. Where the display 110 comprises a touch sensitive display, the processor 100 may display individual avionics command elements and allow a pilot or co-pilot to select individual command elements that are incorrect. Key command elements may be highlighted in a particular color indicating the system will take action on those items. Each key command element may have a checkbox next to it indicating that once a pilot accepts the changes, all checked commands will be executed. The benefit of breaking the string into individual commands is that complex strings can be accepted in part and reevaluated where necessary, and it creates an opportunity to preview and verify each action. The pilot can "activate" voice commands via voice, touch-screen, or pushing a PTR button for a short duration. The display of the Voice Recognition messages may be a permanent display of the PFD or it could be suppressed until a new voice recognition string is indicated, at which point a voice recognition window may automatically spawn from an edge of the display.

Pilot and copilot must be able to see each other's changes to ensure crew resource management. The display 110 may comprise mirrored displays. Both pilots commonly confirm changes with each other due to the criticality of a correct response.

Figure 2:
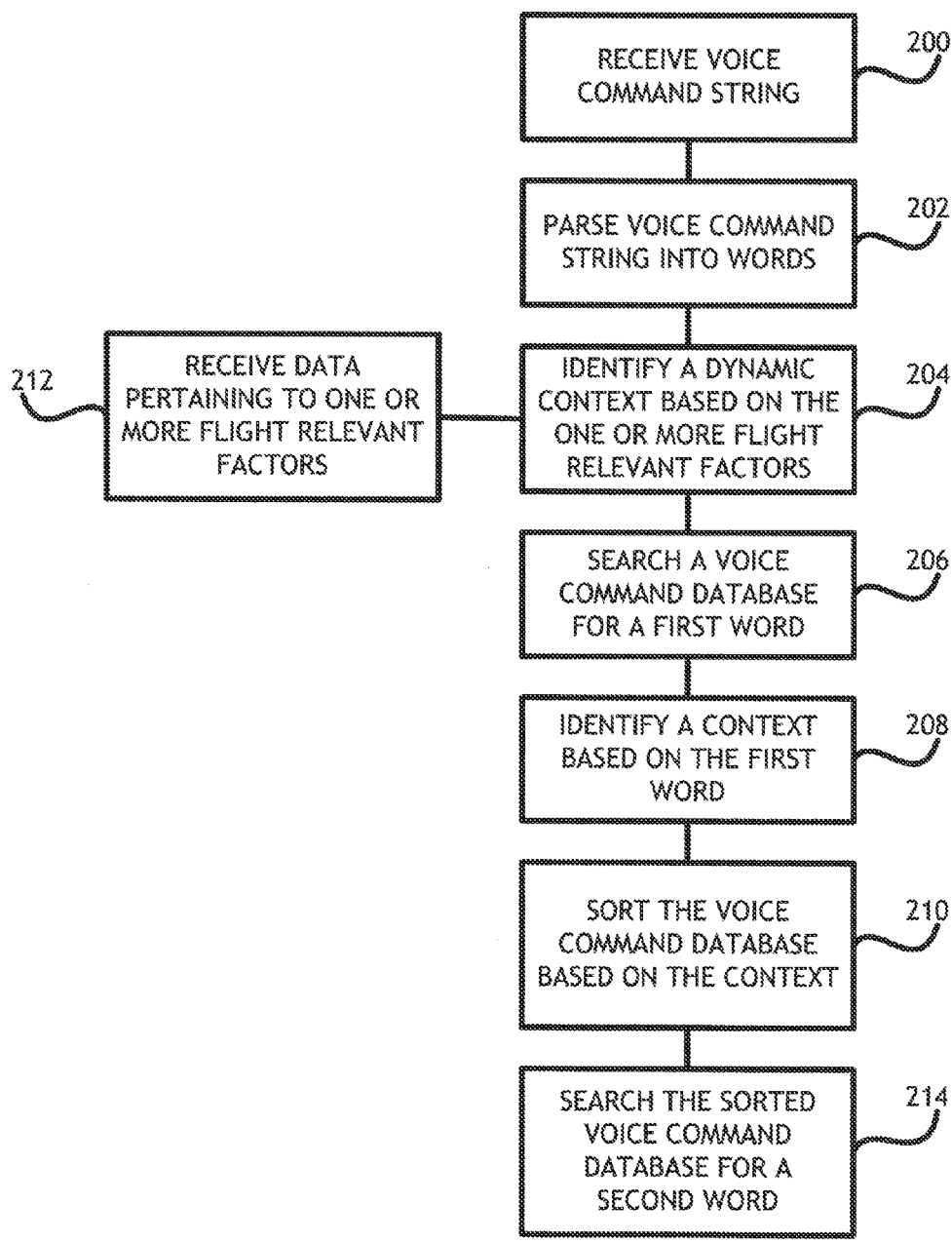
FIG. 2 shows a flowchart of one embodiment of the present invention.

Referring to FIG. 2, a flowchart of one embodiment of the present invention is shown. In at least one embodiment, a computer system receives 200 data corresponding to a voice command. The computer system parses 202 the data into individual words, each word corresponding to a portion of a command string. In one embodiment, the computer system searches 206 a voice command database for a recognizable command corresponding to a first word. Recognizable commands may include ICAO identifiers. The recognizable command may be associated with one or more contextual filters, each of the one or more contextual filters useful for performing voice recognition. The computer system may identify 208 a contextual filter based on the recognizable command.

In another embodiment, the computer system receives 212 data pertaining to one or more factors relevant to an aircraft, airspace or flight parameter such as the location of an aircraft, a flight path, one or more weather conditions or other such factors and uses such data to identify 204 a dynamic contextual filter for performing voice recognition. The contextual filter identified 208 by the computer system may also be based on the dynamic contextual filter.

Once the computer system finds the a recognizable command through voice recognition, the computer system sorts 210 the voice command database based on the contextual filter or dynamic contextual filter or both and searches 214 the sorted voice command database for a recognizable command corresponding to a second word.

Dynamic contextual filters may include filters based on flight phase (taxiing, airborne, final approach, etc.), proximity to navigational aids, airports, traffic, weather, terrain or other flight relevant elements, or airport specific properties such as available taxiways at a current airport.

Figure 3:
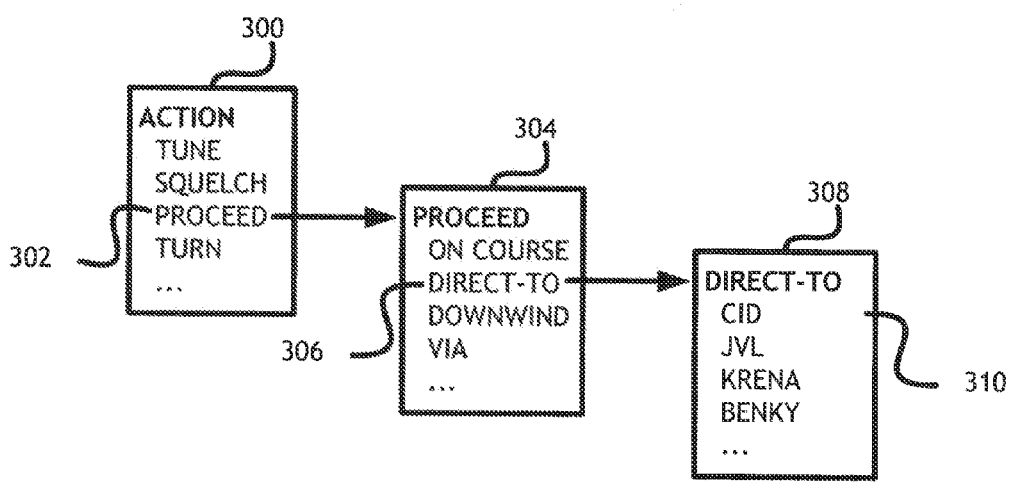
FIG. 3 shows a block diagram representation of one exemplary embodiment of the present invention.

Referring to FIG. 3, a block diagram representation of one exemplary embodiment of the present invention is shown. In one example, a pilot enters a voice command: "Proceed direct-to CID." The pilot may press a button to indicate to a computer system that a voice command is being entered. Upon receiving the voice command, the computer system parses the voice command into distinct elements "Proceed," "direct-to" and "CID." In at least one embodiment, the computer system identifies a first word 302, "Proceed," as an action and searches a database of voice commands. The database may be an action subset 300 of a complete voice commands database, or a database sorted to favor action 300 specific commands.

Once the computer system identifies the first action word 302, the computer system identifies a contextual filter to apply to a voice command database. Contextual filters may include voice commands closely associated with the identified first word 302 or dynamic filters closely associated with a factor relevant to an aircraft, airspace or flight parameter separate from the actual voice command or both. For example, where the computer system receives data indicating that an aircraft is currently airborne, an action command to "proceed" 302 may indicate different modifiers based on one or more aircraft states such as "airborne," "on flight path," "off flight path," "current heading" or other associated factors. One or more associated factors may be used to sort a voice command database or produce a filtered subset 304 of the voice command database including grammar highly associated with the first word 302. The filtered subset 304 may be sorted according to a weight or rank based on the one or more aircraft states. The computer system then searches the sorted, filtered voice command database 304 for a second word 306. In the present example, filtering and sorting produces a filtered, sorted subset 304 where the second word 306 is included in the subset 304 and in a sorted position based on a ranking derived from a dynamic contextual filtering process.

Likewise, once the computer system identifies the second word 362, the computer system may identify another contextual filter, based on the second word 306 or factors relevant to an aircraft, airspace or flight parameter or both, to apply to a voice command database. For example, where the computer system receives data indicating that an aircraft is currently airborne, an action modifier such as "direct-to" 306 may indicate a particular set of potential objects based on one or more aircraft states such as "on path to destination," "on path to alternate," "on path to nearest suitable airport." One or more associated factors may be used to sort a voice command database or produce a filtered subset 308 of the voice command database including grammar highly associated with the second word 306. The filtered subset 308 may be sorted according to a weight or rank based on the one or more aircraft states. The computer system then searches the sorted, filtered voice command database 308 for a third word 310. In the present example, filtering and sorting produces a filtered, sorted subset 308 where the third word 310 is included in the subset 308 and in a sorted position based on a ranking derived from a dynamic contextual filtering process. In the present example, the computer system may identify an appropriate airport code "CID" 310.

A computer system executing a method according to the present invention may thereby perform voice recognition in real time based on dynamic factors to quickly and accurately determine a command to relay to an avionics system.

Figure 4:
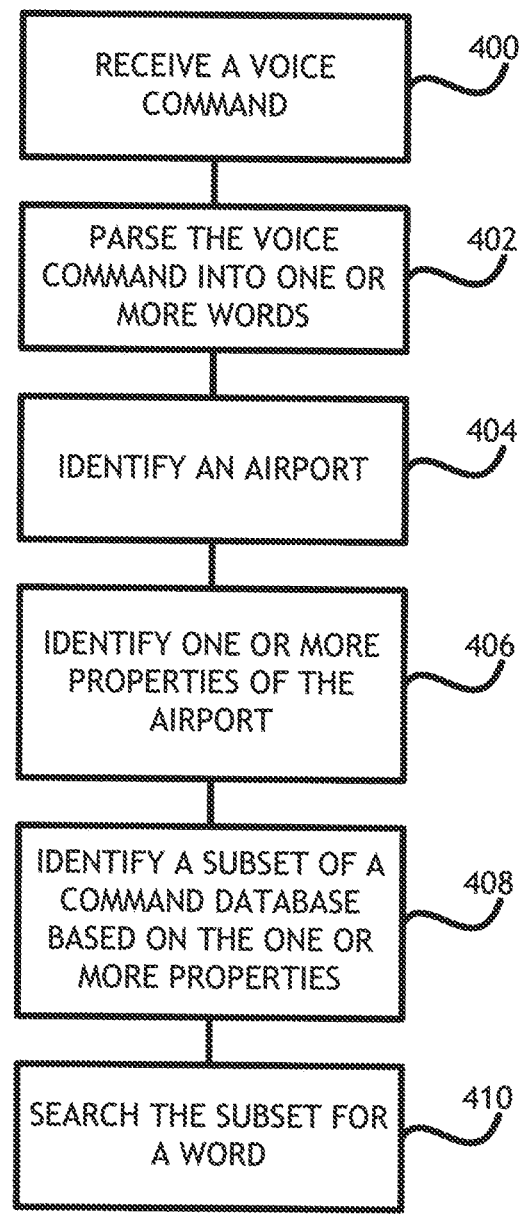
FIG. 4 shows a flowchart of one embodiment of the present invention.

Referring to FIG. 4, a flowchart of one embodiment of the present invention is shown. In at least one embodiment, a computer system receives 400 data corresponding to a voice command. The computer system parses 402 the data into individual words, each word corresponding to a portion of a command string. In one embodiment, where at least one of the words corresponds to an airport identifier, the computer system identifies 404 one or more airports based on a flight path of an aircraft. Each of the one or more airports may be dynamically associated with a particular function based on a known flight plan and a current aircraft location. While performing voice recognition, the computer system identifies 408 a subset of voice command database including relevant airports and searches 410 the voice command database for a recognizable command corresponding to an airport.

In at least one embodiment, the computer system may sort or rank 406 the one or more airports based on one or more known properties of the one or more airports such as proximity or available facilities. Furthermore, the computer system may apply a ranking based on factors such as aircraft condition or weather.

Figure 5:
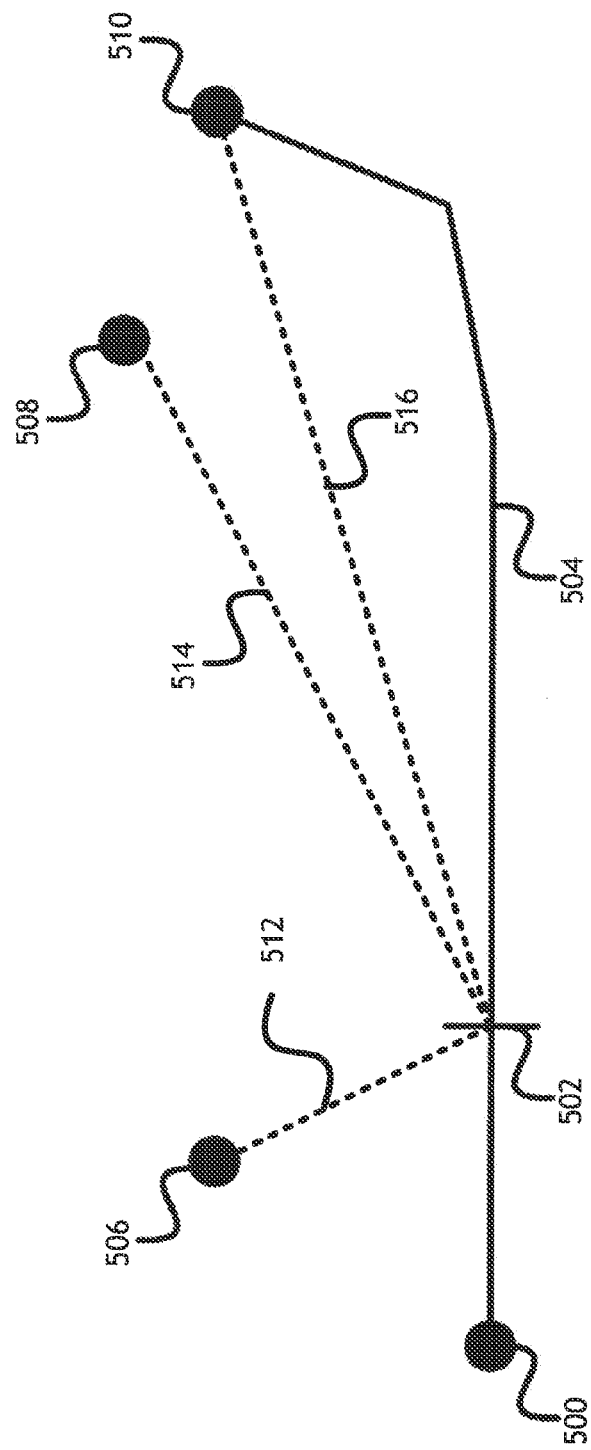
FIG. 5 shows a block diagram representation of one environmental embodiment of the present invention.

Referring to FIG. 5, a block diagram representation of one environmental embodiment of the present invention is shown. In one example, an aircraft traveling along a flight path 504 from an origin airport 500 to a destination airport 510 may include an embodiment of the present invention. Where an on-board computer system receives an indication of the aircraft location 502, the on-board computer system may identify one or more airports 506, 508, based on the flight path 504. For example, the on-board computer may identify an emergency airport 506 as the closest serviceable airport to the current aircraft location 502 via an emergency flight path 512. The on-board computer may dynamically determine the emergency airport 506 based on a known aircraft location 502 and airport properties, possibly maintained in an on-board computer database. The on-board computer may alter entries in a voice command database to reflect the status of an airport as an emergency airport 506 such that a voice command associated with an emergency situation will place a high ranking on the emergency airport 506 during voice recognition.

Likewise, an on-board computer may identify an alternate airport 508 and dynamically determine a direct alternate flight path 514 to the alternate airport 508. The on-board computer may alter entries in a voice command database to reflect the status of an airport as an alternate airport 508 and a direct alternate flight path 514 such that a voice command associated with a situation rendering a destination airport unserviceable will place a high ranking on the alternate airport 508 during voice recognition.

Furthermore, an on-board computer may dynamically determine a direct destination flight path 516 to the destination airport 510. The on-board computer may alter entries in a voice command database to reflect the status of the direct destination flight path 516 such that a voice command associated with a situation rendering the current flight path 504 unserviceable will place a high ranking on the direct destination flight path 516 during voice recognition.

Figure 6:
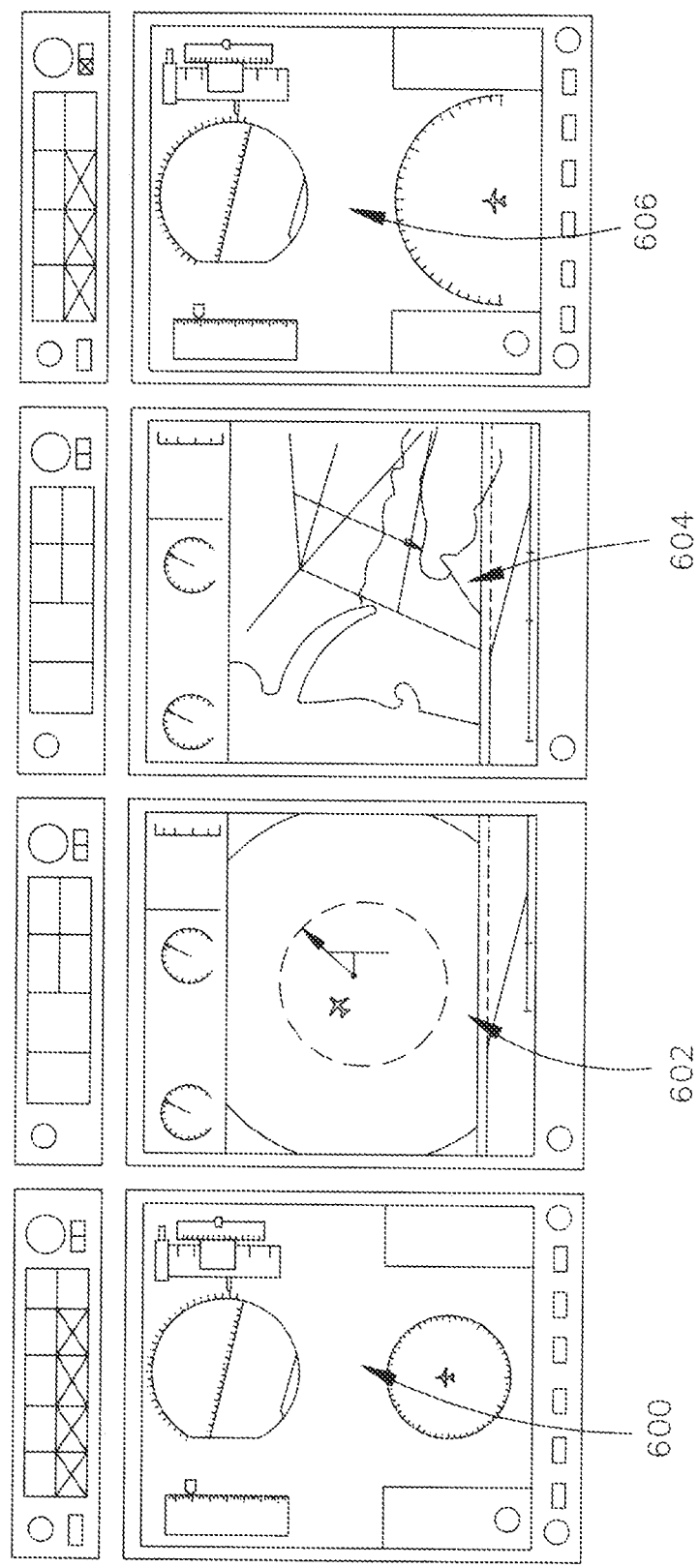
FIG. 6 shows an exemplary representation of a user interface useful in dynamic filtering.

Referring to FIG. 6, an exemplary representation of a user interface useful in dynamic filtering is shown. In at least one embodiment, a user interface may include a plurality of windows 600, 602, 604, 606. In an avionics computer system utilizing one or more graphical user interfaces, the computer system may perform dynamic filtering during voice recognition based on window 600, 602, 604, 606 of particular interest. For example, a first window 600 may display representations of common instrumentation such as an altimeter while a second window 602 displays a representation and information pertaining to an airport or airspace selected by a pilot. Where each window 600, 602, 604, 606 is associated with some defined purpose, each window 600, 602, 604, 606 may be associated with a weighted list potential commands. During voice recognition operations, the computer system may identify which window 600, 602, 604, 606 the pilot is referencing and apply a dynamic filter based on the weighted list associated with such window. In at least one embodiment, the computer system identifies which window 600, 602, 604, 606 the pilot is referencing by identifying the location of a pointer or other graphical user interface (GUI) selection mechanism. Where the pointer is located within the confines of a particular window 600, 602, 604, 606, the computer system may apply the weighted list of commands associated with such window 600, 602, 604, 606.

A person skilled in the art may appreciate that weighted lists of commands may be associated with GUI structures having finer granularity than an entire window. For example, where a window includes a map showing a plurality of airports, a pointer over any one airport may implicate a weighted list of potential commands applicable to features of that airport.

Figure 7:
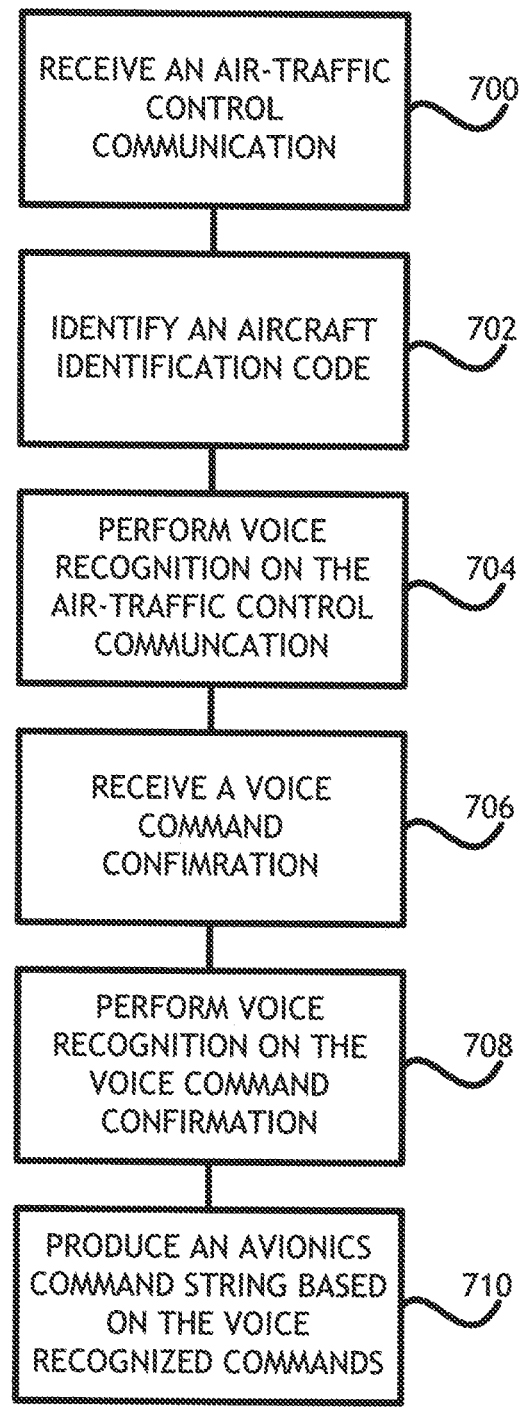
FIG. 7 shows a flowchart of one embodiment of the present invention.

Referring to FIG. 7, a flowchart of one embodiment of the present invention is shown. An on-board aircraft computer system continuously monitors 700 air-traffic control communication frequencies for an aircraft identification code 702 such as a tail number. When the tail number is identified 702 as part of an air-traffic control communication, the on-board computer system performs 704 voice recognition on the command and if possible produces 710 an avionics command string. The pilot may then be given the option to accept the avionics command string.

In some cases, the on-board computer may not be able to produce 710 an avionics command based on the air-traffic control communication because of the quality of such communication. In that event, the on-board computer system may receive 706 a voice command confirmation from the pilot as the pilot communicates with air-traffic control. The on board computer may then perform 708 voice recognition on the voice command confirmation and produce 710 an avionics command based on the voice recognized confirmation, or some combination of both the voice command confirmation and air-traffic control communication.

On on-board computer system may begin voice recognition upon pilot activation of a "push-to-talk" button. In another embodiment, an aircraft may include a dedicated "push-to-recognize" button. The on-board computer system may begin voice recognition upon activation of the push-to-recognize button. For example, a pilot may push the push-to-recognize button and say, "Tune Weather". The on-board computer system may compare a current location and the search a navigation database for the closest weather station. The on-board computer system may display the result to the pilot and execute such command or wait for a pilot confirmation.

It is believed that the present invention and many of its attendant advantages will be understood by the foregoing description of embodiments of the present invention, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:
1. A computer system comprising:
   a processor;
   memory connected to the processor;
   a display connected to the processor;
   a receiver connected to the processor;
   a microphone connected to the processor; and
   computer executable program code configured to execute on the processor,
   wherein the computer executable program code is configured to:
      continuously monitor air-traffic communications frequencies for an aircraft identification code;
      receive air traffic controller data corresponding to a voice command received from an air traffic controller through the receiver, associated with the aircraft identification code;
      parse the air traffic controller voice data into a plurality of words corresponding to individual command elements;

correlate individual voice command elements based on air traffic controller data and individual voice command elements based on pilot voice data;
receive pilot voice data corresponding to a pilot voice command from the microphone;
parse the pilot voice data into a plurality of words corresponding to individual command elements;
produce a contextual filter based on a pointer location in a graphical user interface, said pointer location associated with a weighted list of potential voice commands, a location of the aircraft, a flight plan, and at least one weather condition;
produce a dynamic contextual filter based on a flight phase selected from a list including taxiing, airborne, and final approach;
apply the contextual filter and dynamic contextual filter to one or more databases of command elements to find a first word of the plurality of words and define a first command element associated with the first word;
add the first command element to the dynamic contextual filter;
associate at least one command element corresponding to an airport identification with at least one predefined descriptor based on a distance from an airport identified by the processor, and available airport facilities;
produce a plurality of avionics commands based on the individual command elements; and
receive one or more confirmations, each of the one or more confirmations corresponding to an avionics command.

2. The computer system of claim 1, wherein the computer executable program code is further configured to:
determine that at least one of the plurality of avionics commands does not accurately correspond to an individual command element; and
receive a corrected avionics command.

3. The computer system of claim 1, wherein displaying the plurality of avionics commands comprises highlighting one or more commands in a predefined color indicating the computer system will take action on the highlighted commands when confirmed.

4. The computer system of claim 1,
wherein the computer executable program code is further configured to:
filter a voice command database based on the contextual filter; and
search for at least one word in the voice command database to produce the one or more avionics commands.

5. The computer system of claim 4,
wherein the contextual filter is based on the airport property.

6. An aircraft computer system comprising:
a processor;
memory connected to the processor;
an antenna connected to the processor;
a microphone connected to the processor; and
computer executable program code configured to execute on the processor,
wherein the computer executable program code is configured to:
continuously monitor air-traffic communications frequencies for an aircraft identification code;
receive air traffic controller data corresponding to a voice command received from an air traffic controller through the antenna, associated with the aircraft identification code;
parse the air traffic controller voice data into a plurality of words corresponding to individual command elements;
correlate individual voice command elements based on air traffic controller data and individual voice command elements based on pilot voice data;
receive pilot voice data corresponding to a pilot voice command through the microphone;
parse the pilot voice data into a plurality of words corresponding to individual command elements;
associate at least one command element corresponding to an airport identification with at least one predefined descriptor based on a distance from an airport identified by the processor, and available airport facilities;
produce a contextual filter based on a pointer location in a graphical user interface, said pointer location associated with a weighted list of potential voice commands, a location of the aircraft, a flight plan, and at least one weather condition;
produce a dynamic contextual filter based on a flight phase selected from a list including taxiing, airborne, and final approach;
filter a voice command database based on the contextual filter and dynamic contextual filter;
search for at least one word in the voice command database; and
add the at least one word to the dynamic contextual filter.

7. The aircraft computer system of claim 6, wherein the contextual filter is based on the airport property.

8. The aircraft computer system of claim 6, wherein the computer executable program code is further configured to:
produce a plurality of avionics commands based on the individual command elements;
display the plurality of avionics commands on the display;
mirror the plurality of avionics commands on a co-pilot display; and
receive one or more confirmations, each of the one or more confirmations corresponding to an avionics command.

9. The aircraft computer system of claim 8, wherein the computer executable program code is further configured to:
determine that at least one of the plurality of avionics commands does not accurately correspond to an individual command element; and
receive a corrected avionics command.

10. The aircraft computer system of claim 8, wherein displaying the plurality of avionics commands comprises highlighting one or more commands in a predefined color indicating the computer system will take action on the highlighted commands when confirmed.

11. A method for producing avionics commands through voice recognition comprising:
continuously monitoring air-traffic communications frequencies for an aircraft identification code;
receiving air traffic controller data corresponding to a voice command received from an air traffic controller;
parsing the air traffic controller voice data into a plurality of words corresponding to individual command elements;

correlating individual voice command elements based on air traffic controller data and individual voice command elements based on pilot voice data;

receiving pilot voice data corresponding to a pilot voice command;

parsing the pilot voice data into a plurality of words corresponding to individual command elements;

associating at least one command element corresponding to an airport identification with at least one predefined descriptor based on a distance from an airport identified by the processor, and available airport facilities;

producing a contextual filter based on a pointer location in a graphical user interface, said pointer location associated with a weighted list of potential voice commands, a location of the aircraft, a flight plan, and at least one weather condition;

producing a dynamic contextual filter based on a flight phase selected from a list including taxiing, airborne, and final approach;

filtering a voice command database based on the contextual filter and dynamic contextual filter;

searching for at least one word in the voice command database; and adding the at least one word to the dynamic contextual filter.

12. The method of claim 11, wherein the contextual filter is based on at least one of an aircraft location, a weather event and an aircraft status.

13. The method of claim 11, further comprising:
producing a plurality of avionics commands based on the individual command elements;
displaying the plurality of avionics commands;
mirroring the plurality of avionics commands on a co-pilot display; and
receiving one or more confirmations, each of the one or more confirmations corresponding to an avionics command.

14. The method of claim 13, further comprising:
determining that at least one of the plurality of avionics commands does not accurately correspond to an individual command element; and
receiving a corrected avionics command.

15. The method of claim 13, wherein displaying the plurality of avionics commands comprises highlighting one or more commands in a predefined color indicating the computer system will take action on the highlighted commands when confirmed.

* * * * *